(12) United States Patent
Fabricius et al.

(10) Patent No.: US 7,073,650 B2
(45) Date of Patent: Jul. 11, 2006

(54) FRICTION PLATE GROOVE PATTERN

(75) Inventors: Emilio Fabricius, Oftersheim (DE); Erik Seeber, Darmstadt (DE); Dieter Zimprich, Eppelheim (DE); Nico Sigel, Muchen (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/437,746

(22) Filed: May 14, 2003

(65) Prior Publication Data

US 2003/0230463 A1 Dec. 18, 2003

(30) Foreign Application Priority Data

Jun. 15, 2002 (EP) .................................. 02013203

(51) Int. Cl.
*F16D 13/72* (2006.01)

(52) U.S. Cl. ............................. 192/113.36; 192/70.12; 192/107 R

(58) Field of Classification Search ............ 192/70.12, 192/70.14, 107 R, 113.36
See application file for complete search history.

(56) References Cited

U.S. PATENT DOCUMENTS

| 4,280,609 A | | 7/1981 | Cruise | |
|---|---|---|---|---|
| 4,730,713 A | | 3/1988 | Pickard et al. | |
| 5,460,255 A | * | 10/1995 | Quigley | ................. 192/113.36 |
| 5,566,802 A | * | 10/1996 | Kirkwood | ................... 192/3.29 |
| 5,669,474 A | * | 9/1997 | Dehrmann et al. | ........ 192/3.29 |
| 5,975,260 A | * | 11/1999 | Fischer et al. | ............. 192/3.29 |
| 6,212,930 B1 | | 4/2001 | Skrabs et al. | |
| 6,247,568 B1 | * | 6/2001 | Takashima et al. | ...... 192/70.12 |
| 6,283,265 B1 | * | 9/2001 | Hirayanagi et al. | ...... 192/70.12 |
| 2001/0045333 A1 | * | 11/2001 | Otto et al. | .................. 192/3.29 |

FOREIGN PATENT DOCUMENTS

| DE | 28 54 051 | 6/1979 |
|---|---|---|
| DE | 35 32 759 C1 | 3/1987 |
| EP | 0 625 647 A | 11/1994 |
| EP | 0 874 180 A | 10/1998 |
| GB | 934002 | 8/1963 |
| GB | 2 010 422 A | 6/1979 |
| WO | WO 97/32678 | 9/1997 |

OTHER PUBLICATIONS

European Search Report in Application No. EP 02 01 3203 which corresponds to this U.S. application.

* cited by examiner

*Primary Examiner*—Richard M. Lorence
(74) *Attorney, Agent, or Firm*—Emch, Schaffer, Schaub & Porcello, Co. and Greg Dziegielewski

(57) ABSTRACT

A plate (1) for a multiple-plate clutch has at least one friction surface (4) for transmitting a torque, in particular for a wet-running switchable multiple disk clutch. The plate (1) has at least one friction surface (4) which has grooves (7.1, 7.2, 10.1, 10.2) with an inside bordering edge (6) and an outside bordering edge (5), and at least one groove (7.1, 7.2, 10.1, 10.2) that runs from the inside bordering edge (6) to the outside bordering edge (5). The at least one groove (7.1, 7.2, 10.1, 10.2) has at least one bending point (8.1, 8.2, 9.1, 9.2, 11.1, 11.2, 12.1, 12.2) at which the at least one groove (7.1, 7.2, 10.1, 10.2) is bent at an angle ($\alpha_1, \alpha_2, \alpha_3, \alpha_4$).

6 Claims, 2 Drawing Sheets

FRICTION PLATE GROOVE PATTERN

BACKGROUND OF THE INVENTION

This invention relates to a plate having at least one friction surface for a multiple-plate clutch, in particular for a wet-running switchable multiple-plate clutch. Multiple-plate clutches on which the present invention is based are known in general in a variety of modifications. For example, reference may be made to the variants of the embodiments described in German Patent 28 54 051 A1, U.S. Pat. No. 4,280,609 or German Patent 35 32 759 C1.

Accordingly, the essential components of such multiple-plate clutches to which reference is made below include two or more plates having an essentially ring-shaped shape. If the multiple-plate clutch includes a plurality of plates, as is the case in the majority of such multiple plate clutches, then a first group of plates, the so-called outer plates, are arranged on an outer plate carrier, called the drive ring, which is connected to a shaft, e.g., a drive shaft, and a second group of plates, the so-called inner plates, are arranged on an inner plate carrier which is connected to a shaft, e.g., an output shaft. The plates of the two groups engage in the manner of gears to form a plate package, with one outer plate being adjacent to an inner plate. Outer plates and inner plates are displaceable relative to one another in the axial direction and can be brought into or out of frictional engagement with their adjacent end faces in pairs, i.e., transmitting torque from the drive shaft to the output shaft.

The plates on which the present invention is based are known from the state of the art in a plurality of modifications. For example, there are known plates which have a friction lining, which is usually made of a fibrous material or the like, on one or both essentially ring-shaped end faces of a preferably metallic carrier. There are also those made of a single material in one piece, in particular those made of a friction material of the aforementioned type. Reference is gain made to the discussions and citations in the aforementioned publications as examples.

As a rule, at least one of the two end faces—the so-called friction surfaces—which can be brought into frictional connection with one another, of adjacent plates is provided with a specially designed surface structuring and/or with a pattern grooves.

For example, International Patent WO 97/32678 describes surface structuring of so-called steel plates, where this structuring causes an increase in the coefficient of friction of the steel and friction coating surfaces of adjacent plates which are in contact with one another.

On the other hand, the clutch plate illustrated in FIG. 2 of U.S. Pat. No. 4,280,609 as well as the clutch plate illustrated in FIG. 4 of German Patent 28 54 051 A1 both have a so-called waffle pattern of grooves on their friction surfaces, where a plurality of parallel linear grooves are intersected by a plurality of parallel linear grooves running at right angles to the former. The reason for such a groove structure lies in the necessity of cooling the surfaces which rub one against one another, this cooling being implemented by a stream of coolant passing through these grooves.

Although plates have been developed for a wide variety of equipment transmitting a torque, e.g., clutches, brakes and the like, and the plates have been adapted to the different stresses accordingly, there are still unwanted problems for many applications. Namely, there is still certain frictional contact between adjacent plates for a variety of reasons even when the equipment is not being operated, i.e., when no torque is to be transmitted but there is, nevertheless, a torque, the so-called drag torque, which is transmitted from the drive shaft to the output shaft or vice-versa.

SUMMARY OF THE INVENTION

Thus, the object of this invention is to design friction plates for multiple plate clutches and improve upon the friction plates so that the drag torque is reduced.

This object is achieved according to this invention with a plate having at least one groove that extends from an inner bordering edge to an outer bordering edge where the at least one groove has at least one bending point at which the at least one groove is bent at an angle.

Advantageous embodiments and refinements of this invention are characterized in the subclaims.

This invention is based in general on a plate having at least one friction surface for a multiple-plate clutch for transmitting a torque, e.g., for a wet-running switchable multiple-plate clutch which has a friction surface having at least one groove. In the case of at least one groove running from the inner bordering edge of the friction surface to its outer bordering edge, it is provided according to this invention that this groove will have at least one bending point at which it is bent at an angle. The coolant, such as oil or the like, passes by this bending point, where it creates a spot increase in the static pressure according to the law of conservation of pressure as discovered by Bernoulli, according to which for any streamline, the sum of the static pressure and the dynamic pressure (as well as the geodetic pressure) is constant. This spot increase in pressure results in adjacent plates being pressed apart and thus not being in friction engagement when the torque transmission device (clutch) is not being actuated. The result is ultimately a reduction in the drag torque.

Model calculations and empirical experiments have shown that an especially great reduction in drag torque occurs with grooves having one or two bending points if an angle (deflection angle or bending angle) at the bending point or points is selected to be between about 75° and about 115°. Furthermore, it has been found to especially advantageous if the grooves in question have at least two successive bending points at which these grooves are diverted in opposite directions. The grooves of an essentially ring-shaped plate therefore preferably form an S shape or Z shape. There are no restrictions with regard to the width or depth of the groove. The groove channels outside of the S or Z shape may have the same or different width and may also be offset radially, with approximately one groove width preferably being set as the minimum offset distance.

It has been found to be advantageous if at least two adjacent grooves have a mutually opposing course. It is also advantageous if at least two adjacent grooves run in the same direction a symmetrical arrangement of grooves in groups or pairs over the surface of a ring-shaped plate, for example. The groove may be arranged according to the direction of rotation or with (radial) symmetry.

In the case of plates having a friction lining, the grooves of the aforementioned type are preferably incorporated into the friction lining. The depth of the groove (and, in certain embodiments, also the width of the groove) may be coordinated with the particular application case. The depth of the groove may also include the total friction lining thickness. A combination of different groove depths and groove width is also possible. In addition, other grooves may also be provided, aimed, for example, at a certain loading or switching performance of the clutch.

Furthermore, it is also provided according to this invention that plates, which are designed in the manner of disks and have friction surfaces on their two end faces, have identical grooves, i.e., identical patterns of grooves on both of their end faces. The groove patterns on the front and rear sides may be oriented according to the direction of rotation, with (radial) symmetry or in opposition. The grooves on the front side and the grooves on the rear side may also be designed to be identical, and in addition they may be offset mutually by a certain angle.

Finally, this invention also provides for a portion of the grooves to be designed optionally as blind grooves.

According to another variant of this invention, the width of the groove in the case of the grooves in question varies over its longitudinal extent.

BRIEF DESCRIPTION OF THE DRAWINGS

Various exemplary embodiments of the present invention are illustrated in the drawings and are described in greater detail below. They show.

DETAILED DESCRIPTION OF THE PREFERRED EMBODIMENTS

Figure 1:
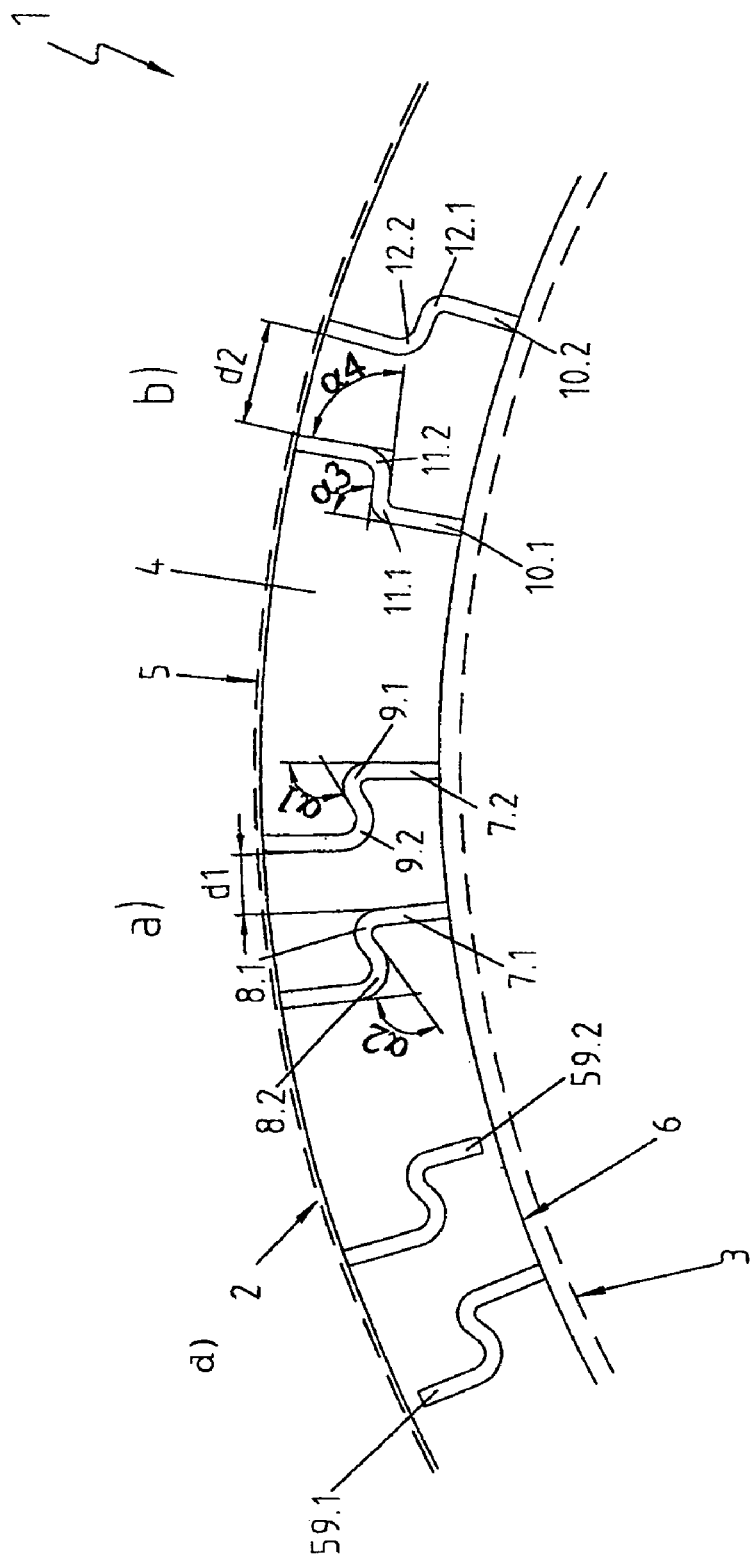
FIG. 1—various groove patterns according to this invention on a ring-shaped friction plate (detail)
  a) s-shaped grooves running in the same direction
  b) s-shaped grooves running in the opposite direction
  c) grooves with a single bending point running in the same direction FIG. 2—details of various annual friction plates having friction linings, which exhibit the groove patterns according to this invention
  a) s-shaped grooves running in the opposite direction
  b) s-shaped grooves running in the same direction, type spacing, angle (of curvature) <90°
  c) s-shaped grooves running in the same direction, greater spacing between grooves
  d) s-shaped grooves running in the same direction, type spacing, angle (of curvature) >90°
  e) s-shaped grooves running in the same direction, type spacing, curvature offset radially toward the outside
  f) s-shaped grooves running in the same direction, wide distance between adjacent grooves, curvature offset radially toward the outside
  g) a groove pattern corresponding to that in FIG. 2b) but with different groove widths at the inflow and outflow sides.

FIG. 1 shows a selection of grooves according to this invention in a ring-shaped plate 1.

It should be pointed out in advance that the actual friction surface of a plate need not necessarily include the entire end face or even both end faces but instead, as in the present case, a ring-shaped section may be formed as the friction surfaces or as described in German Patent Application 28 54 051 A1, separate partial areas of the end faces may be designed as the friction surfaces. In addition, as already indicated in the introduction to the description, the "bare" end face of a plate or the end face provided with a friction coating or a combination of these two variants may also serve as the friction surface.

In the present case, the ring-shaped plate 1 is bordered in the radial direction by the outside circumference, which has been labeled as 2 in FIG. 1, and the inside circumference, which has been labeled as 3. The friction surface 4 of plate 1 is bordered by the outside circumference 5, which lies inside the outside circumference 2 of the ring-shaped plate 1, and the inside circumference 6, which lies inside the inside circumference 3 of plate 1. Thus, in the present case the actual friction surface 4 is much smaller than the end side area of plate 1 shown here.

FIG. 1a) shows two s-shaped grooves 7.1 and 7.2 running in the same direction and arranged side-by-side. The grooves extend from the inside circumference 6 of the friction surface 4 to its outside circumference 5. There are two bending points 8.1 and 8.2 or 9.1 and 9.2 according to this invention, situated essentially at the center between the inside circumference 6 and the outside circumference, where the grooves 7.1 and 7.2 at first run counterclockwise and then clockwise with a bend, starting from the inside circumference 6. The angles (of bending) are represented by the symbols $\alpha_1$ and $\alpha_2$ in the figure. The minimum distance between adjacent grooves 7.1 and 7.2, which should not be less than the width of one groove, is labeled as $d_1$ in the figure.

FIG. 1b) shows two s-shaped grooves 10.1 and 10.2 running in opposite directions side by side. Like grooves 7.1 and 7.2 in the exemplary embodiment described above, these grooves extend from the inside circumference 6 of the friction surface 4 to its outside circumference 5. Again there are two bending points 11.1 and 11.2 or 12.1 and 12.2 according to this invention at which the grooves 10.1 and 10.2 run first counterclockwise with the bending points which run eccentrically and are offset radially in the direction of the outside circumference 5. The angles (of bending) are labeled as $\alpha_3$ and $\alpha_4$ in the figure. The minimum distance between the adjacent grooves 10.1 and 10.2, which in turn should be no less than one groove width, is labeled as $d_2$ in FIG. 1b).

FIG. 1c) illustrates a third exemplary embodiment in which two identical grooves 13.1 and 13.2 adjacent to one another run from the inside circumference 6 of the friction surface 4 to its outside circumference 5. Essentially at the center between the inside circumference 6 and the outside circumference 5 is their single bending point 14.1 and/or 15.1 at which the grooves 13.1 and/or 13.2 run clockwise with a kink, starting from the inside circumference 6. The angle (of the kink) is represented by $\alpha_5$ in the figure, and the minimum distance between adjacent grooves 13.1 and 13.2 is represented by the symbol $d_3$.

Figure 2:
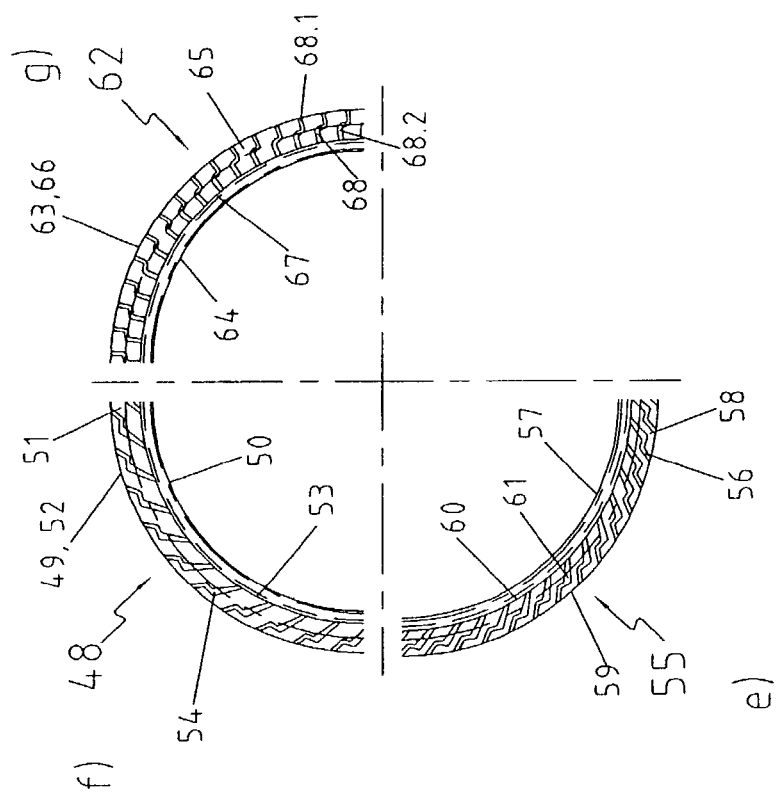
Figure 2:
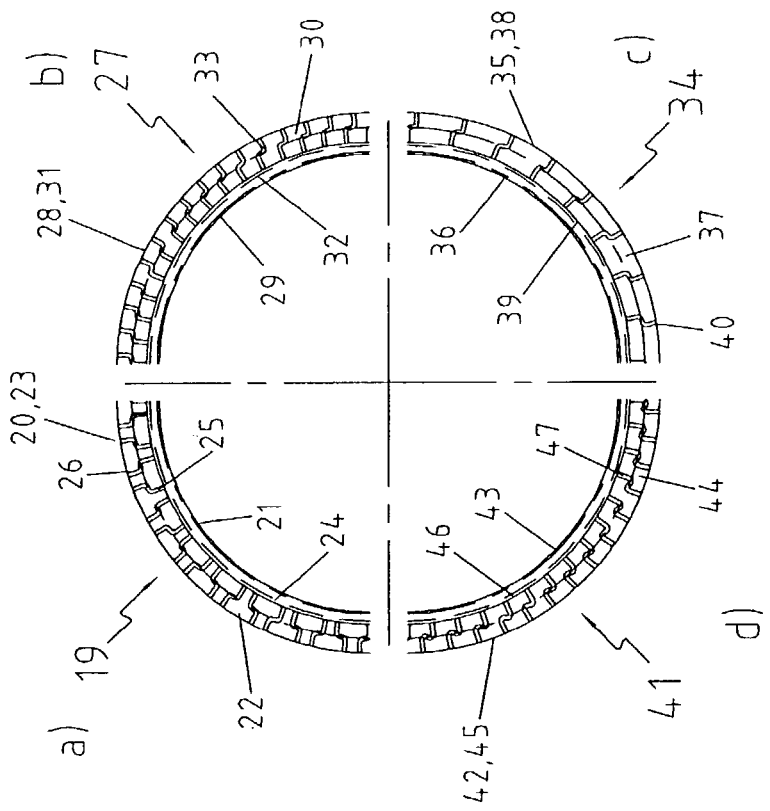

FIG. 2 shows in general different ring-shaped friction linings with groove patterns according to this invention.

In the case of plate 19 shown in FIG. 2a), the outside circumference is labeled as 20 and the inside circumference is labeled as 21. The lining on plate 19 forming friction surface 22 is bordered by the outside circumference 23, which coincides with the outside circumference 20 of the ring-shaped plate 19 and by the inside circumference 24 which is within the inside circumference 21 of plate 19. The actual friction surface 22 in the present case is thus also smaller than the end side face of the plate 19 shown here, bordered by its outside circumference 20 and inside circumference 21.

In the present case, s-shaped grooves 25 and 26 running essentially in opposite directions but with the same spacing are incorporated into the friction lining around the entire circumference of plate 19.

In the case of plate 27 show in FIG. 2b), the outside circumference and inside circumference are labeled as 28 and 29, in accordance with the preceding exemplary embodiment. The lining on the plate 27, which forms the friction surface 30, is in turn bordered by the outside circumference 31, which coincides with the outside circumference 28 of the ring-shaped plate 27, and by the inside circumference 32, which is within the inside circumference 29 of the plate 27.

In the present exemplary embodiment, s-shaped grooves 33 running in the same direction according to this invention are incorporated into the friction lining. This variant of the embodiment is characterized by a comparatively tight distance between adjacent grooves 33 and an angle of bending of less than 90° at the respective bending points.

In the case of plate 34, illustrated in FIG. 2c), the outside circumference and the inside circumference are labeled as 35 and 36, in accordance with the preceding exemplary embodiment. The lining on plate 34 forming friction surface 37 is bordered by the outside circumference 38, which coincides with the outside circumference 35 of the ring-shaped (friction) plate 34 and by the inside circumference 39, which is inside of the inside circumference 36 of the plate 34.

Characteristics of this embodiment include the adjacent grooves 40 running in the same direction, the s-shaped grooves 40 and the radially central arrangement of the bending points of the grooves 40 between the outside circumference 38 and the inside circumference 39 of the friction surface 37.

The exemplary embodiment according to FIG. 2d) includes an essentially ring-shaped plate 41 with an outside circumference 42 and an inside circumference 43 in accordance with the three preceding exemplary embodiments. The friction surface 44 having the friction lining is also designed in a ring shape with an outside circumference 45 and an inside circumference 46 and extends on the end face of plate 41 up to its outside circumference 42 but not as far as its inside circumference 43, It is characteristic of this embodiment that the grooves 47 incorporated into the friction lining forming the friction surface 44 run in the same direction in the form of mirror-image S pattern over the entire circumference. The distance between adjacent grooves 47 is small in comparison with that of the variant described above according to subfigure 2c) but it is comparable to the distance between adjacent grooves 33 in the embodiment according to subfigure 2b). In contrast with the latter embodiment however, the angle (of curvature) at the bending point is much greater than 90° in the present case.

The embodiment according to FIG. 2e) also includes an essentially ring-shaped plate 48 (outside circumference 49, inside circumference 50) according to four preceding exemplary embodiments. The friction surface 51 which is also provided with a friction lining is likewise designed in a ring shape which only partially covers the end face of plate 48 (outside circumference 52, inside circumference 53).

This friction lining also has s-shaped grooves 54 with a comparatively small distance between them running in the same direction. In the present case however the bending points are arranged with a radial offset toward the outside in comparison with the preceding embodiments of FIG. 2.

Plate 55 (outside circumference 56 and inside circumference 57 of the plate), illustrated in FIG. 2f), has s-shaped grooves 61 running in the same direction cut in the friction lining/surface 58 (outside circumference 59 and inside circumference 60 of the friction surface 58), these grooves being designed in the manner of the preceding embodiment according to FIG. 2e). However in this case, a greater distance between adjacent grooves 61 has been selected along with bending points that have been shifted further outward in the radial direction.

The point 62 shown in FIG. 2g) having the outside circumference 63 and the inside circumference 64 is designed to be largely identical to the exemplary embodiment according to FIG. 2b) in its friction lining/surface 65, which is bordered by the outside circumference 66 and the inside circumference 67.

In the present exemplary embodiment, s-shaped grooves 68 running in the same direction are incorporated into the friction lining. Here again the comparatively tight spacing of adjacent grooves 68 and an angle of bending of less 90° at the respective bending points are characteristic of this embodiment.

In addition, the widths of the grooves 68 at the inflow side 68.2 or different from the widths of the grooves 68 on the outflow side 68.1.

INDUSTRIAL APPLICABILITY

The present invention is useful as a plate for multiple-part clutch plates and the like. The above descriptions of the preferred and alternative embodiments of the present invention are intended to be illustrative and are not intended to be limiting upon the scope and content of the following claims.

The invention claimed is:

1. A plate for a substantially circular multiple-plate clutch comprising at least one friction surface which has grooves having an inner bordering edge and an outer bordering edge, whereby at least one groove runs from the inner bordering edge to the outer bordering edge, characterized in that the at least one groove has at least one bending point at which the at least one groove is bent at an angle ($a_1$, $a_2$, $a_3$, $a_4$, $a_5$), wherein the angle at which the at least one groove is bent is from about 75° to about 115°; with respect to a line that is a radius of the substantially circular multiple-plate clutch that extends radially from the inner bordering edge to the outer bordering edge, and at least one additional groove is provided, the at least one additional groove being designed as a blind groove staring from the inside bordering edge or the outside bordering edge and have at least one bending point at which the at least one additional groove is bent at an angle, the at least one additional groove being bent in substantially the same manner as the at least one groove.

2. The plate according to claim 1, characterized in that the at least one groove has at least two successive bending points at which the at least one groove is bent in opposite directions ($a_1$, $a_2$, $a_3$, $a_4$, $a_5$).

3. The plate according to claim 1, characterized in that at least two adjacent grooves run in the same direction.

4. The plate according to claim 1, in which the friction surface is a friction lining, characterized in that the at least one groove is incorporated into the friction lining.

5. The plate according to claim 1, wherein the plate comprises a disk having opposing end faces and which has friction surfaces on both end faces, characterized in that the friction surface arranged on the end faces have identically patterned grooves.

6. The plate according to claim 1, characterized in that the at least one groove is designed with varying widths over its longitudinal extent.

* * * * *